United States Patent Office 3,455,851
Patented July 15, 1969

3,455,851
RUBBER REINFORCING COMPOSITIONS COMPRISING PHENOL/SULFUR RESINS
Rupert Frederick Keith Meredith, Kerrylea, England, and Edward James Risdon, Penarth, Glamorgan, Wales, assignors to The Distillers Company Limited, Edinburgh, Scotland, a British company
No Drawing. Continuation of application Ser. No. 529,953, Feb. 25, 1966. This application Sept. 23, 1968, Ser. No. 764,033
Claims priority, application Great Britain, Feb. 27, 1965, 8,551/65
Int. Cl. C08d 9/10; C08c 9/16
U.S. Cl. 260—3                                   9 Claims

ABSTRACT OF THE DISCLOSURE

The present disclosure provides for a vulcanizable rubber mixture comprising rubber, a free sulphur vulcanizing system and a rubber reinforcing composition comprising a formaldehyde donor and a reactive phenolic composition containing a resin obtained by reacting a phenol with sulphur or sulphur chloride, the amount of phenol/sulphur resin being between 1 and 15% by weight of the rubber.

---

The present invention relates to a vulcanizable rubber mixture comprising rubber, and vulcanized rubber products obtained by vulcanizing said vulcanizable rubber mixture. It further relates to a process for the production of a rubber reinforcing composition.

By rubber is meant throughout the specification, natural rubber or a synthetic rubber capable of vulcanization, for example with sulphur. Examples of such synthetic rubbers are the rubbers obtained by polymerizing or copolymerizing di-olefinically unsaturated compounds to give polymers or copolymers containing sufficient unsaturation to enable vulcanization to take place. Well known examples of synthetic rubbers are polyisoprene, polybutadiene, polychloroprene, butadiene/styrene copolymers, butadiene/acrylonitrile copolymers, isobutylene/isoprene copolymers and ethylene/propylene terpolymers in which the third component contains at least two ethylenically unsaturated groups.

The reinforcment of vulcanized rubber articles by the addition of reinforcing resins to the vulcanizable rubber mixtures from which they are to be formed, is well known. One known class of reinforcing resins consists of phenolic novolak resins.

An object of the present invention is to provide new and improved means for the reinforcement of vulcanized rubber products.

Accordingly, the present invention is a vulcanizable rubber mixture comprising rubber, a free sulphur vulcanizing system and a rubber reinforcing composition comprising a formaldehyde donor and a reactive phenolic composition containing or consisting of a phenol/sulphur resin obtained by reacting a phenol with sulphur or a sulphur chloride, the amount of phenol/sulphur resin being between 1 and 15% by weight of the rubber. The invention is further said rubber reinforcing composition.

By a reactive phenolic composition is meant throughout this specification a composition which is essentially not heat advancing or self-hardening and which reacts with a formaldehyde donor to give a thermoset reaction product. If the phenol/sulphur resin does not so react with the formaldehyde donor a novolak resin must be added to the composition, or the phenol/sulphur resin must be co-condensed, through formaldehyde or a formaldehyde donor, with a phenol which is trifunctional to formaldehyde. The phenol/sulphur resin may be partially reacted with the formaldehyde donor in the rubber reinforcing composition. Phenol/sulphur resins which are capable of reacting with a formaldehyde donor to give a thermoset product can, nevertheless, be blended with other types of reinforcing resin to give reactive phenolic compositions for use in the present invention.

The resins obtained by reacting a phenol with sulphur or its chlorides (herein referred to as phenol/sulphur resins) are well known. They are prepared from phenols having at least two free positions ortho or para to a phenolic hydroxyl group. Examples of phenols which form reactive phenol/sulphur resins are phenol, ortho, meta or para lower alkyl (up to $C_6$) or alkenyl phenols (including for example commercial cresols or their higher analogues which contain appreciable amounts of the appropriate meta isomer and the phenols obtained from crude or refined cashew-nut shell liquid), ortho or para cyclopentenylphenol and spaced polyphenols. Phenols ($C_6H_5OH$), the lower meta alkyl and alkenyl phenols are preferred for the reinforcement of styrene/butadiene rubbers and resorcinol is preferred for the reinforcement of natural rubber.

The reaction of a saturated phenol with the sulphur or sulphur chloride is generally carried out under alkaline conditions. The proportion of phenol to sulphur in the reaction mixture in which a phenol/sulphur resin is formed can be varied widely, but it is preferred that in the final resin the ratio of the combined phenol to the combined sulphur (mol/atom) shall not exceed 1.5 and shall not be less than 0.5. Excess phenol or sulphur can be removed from the reaction mixture to provide a substantially pure phenol/sulphur resin or the excess may be left mixed with the resin provided that its presence in the rubber reinforcing composition does not have a deleterious effect on the properties of the final vulcanizate.

The use of unsaturated phenols in the production of phenol/sulphur resins from sulphur has the advantage that little or no hydrogen sulphide is produced, if the alkaline catalyst is omitted. With saturated phenols and sulphur in the presence of an alkaline catalyst, hydrogen sulphide is evolved during the reaction.

The phenol/sulphur resin forms between 1 and 15% by weight of the rubber in the vulcanizable rubber mixture. As described hereafter the phenol/sulphur resin may be modified by reaction with other materials; when this is done the proportion of phenol/sulphur resin to rubber mentioned above refers to the weight of phenol/sulphur resin before modification.

By a formaldehyde donor is meant a compound which acts as a source of formaldehyde or acts as if it were a source of formaldehyde, or acts as methylenating agent under the conditions used in the vulcanization of rubber.

The formaldehyde donors which can be used under appropriate conditions include hexamethylene tetramine, paraform, anhydroformaldehyde aniline, resoles and some solid and liquid etherified or unetherified melamine/formaldehyde resins. The formaldehyde donor selected must be readily soluble or dispersible in the unvulcanized or vulcanizing rubber composition and must not be used under conditions nor at a concentration such that either blistering of the vulcanized rubber is found or there is excessive evolution of unabsorbed noxious gases, e.g. formaldehyde, during or after the compounding or vulcanizing of the rubber. Most conveniently the formaldehyde donor is a solid compound. The preferred formaldehyde donor is hexamethylene tetramine. The amount of formaldehyde donor present is sufficient to form a thermoset product on reaction with the reactive phenolic composition containing or consisting of the phenol/sulphur resin. Most suitably when hexamethylene tetramine is employed it is present by weight in amount corresponding to 6% to 15% by weight of the reactive phenolic composition.

According to a preferred embodiment of the present invention the reactive phenolic composition contains a novolak resin in addition to the phenol/sulphur resin which is itself capable of reaction with the formaldehyde donor to give a thermoset product.

By a novolak resin is meant throughout this specification a thermoplastic product which has been formed by reacting a phenol or phenols at least one of which has three free positions ortho- or para- to a phenolic hydroxyl group with less than one molar proportion of an aldehyde in an acid reaction medium. The preferred phenols are phenol and meta alkyl and alkenyl phenols (including, for example, commercial cresols which contain appreciable amounts of meta cresol and of xylenols, and the phenols obtained from crude or refined cashew-nut shell liquid). Mixtures of phenols may be used to make the novolak and the novolak may be a mixture of novolaks. The novolak resin may contain a spaced polyphenol component, or phenolic modified partially polymerized cashew-nut shell liquid or other components based essentially upon cashew-nut shell liquid. The preferred aldehyde from which to make the novolak resin is formaldehyde. The reaction conditions under which a novolak resin is formed, i.e. the acid reaction medium and the molar excess of phenol to aldehyde, will herein be referred to as novolak condensation conditions. Novolak resins and the reaction conditions under which they are formed are well known.

In compositions containing novolak resins according to the present invention the weight proportion of phenol/sulphur resin to novolak resin can vary widely for instance from 1 to 10 to 10 to 1. Preferred compositions contain from 1 to 6 parts of novolak resin to 1 of phenol/sulphur resin.

A process for the production of the rubber reinforcing compositions according to the present invention comprises forming a phenol/sulphur resin under conditions which leave some phenol unreacted and then reacting this phenol with an aldehyde under novolak reaction conditions. This process leads to particularly valuable results when the aldehyde is formaldehyde and the phenol is phenol, meta alkyl or alkenyl phenols (including, for example, commercial cresols or their higher analogues which contain appreciable amounts of the appropriate meta-isomer and the phenols obtained from crude or refined cashew-nut shell liquid) and ortho or para substituted alkenyl phenols (including, for example, ortho or para cyclopentenylphenol). When operating this process for the production of the rubber reinforcing compositions according to the present invention, a novolak resin which has been made separately and which may contain spaced polyphenols or components based essentially upon cashew-nut shell liquid, or the latter components alone may be added to the reaction mixture, or blended with the final ground resin.

A further process for the production of the rubber reinforcing compositions according to the present invention comprises forming a phenol/sulphur resin and modifying it by reacting the resin with an aldehyde under alkaline conditions. The product obtained is further reacted (co-condensed) with (i) additional phenol, which may be different from the original phenol and is usually phenol ($C_6H_5OH$) or a m-alkylphenol, and with (ii) additional aldehyde under novolak reaction conditions. This process is particularly valuable when the original phenol is ortho or para substituted or is ethylenically unsaturated in a substituent, although other phenols may also be reacted by this route. The preferred phenols are ortho- or para-cyclopentenylphenol, ortho or para alkyl phenols and the phenols derived from crude or refined cashew nut shell liquid. The preferred aldehyde is formaldehyde. When operating this process for the production of the rubber reinforcing compositions according to the present invention, a novolak resin which has been made separately and which may contain spaced polyphenols or components based essentially upon cashew nut shell liquid, or the latter components alone, may be added to the reaction mixture or blended with the final ground resin.

The preferred reinforcing compsitions are solid at room temperature, having for example a ball and ring softening point greater than 75° C. and suitably within the range 80 to 105° C. It is also preferred to use compositions having a heat hardening time at 130° C. of less than 25 minutes. By heat hardening time is meant the time taken by the hardening resin to just pass the "rubbery stage" prior to complete gelatin. The test is carried out in the presence of 10 parts of hexamethylene tetramine per 100 parts of resin by placing 0.22 gram of test material in a test tube and placing the latter in a bath maintained at 130° C.

The rubber reinforcing compositions may be added to the rubber according to any of the techniques well known in the art for adding reinforcing resins to rubbers. The solid compositions can be incorporated into the rubber at the same time as the usual compounding additives in conventional machinery. Dispersion of the composition, for example when using two bowl rolls, can be aided by fluxing it with the rubber on the rolls at a temperature which is not appreciably below the softening point of the reactive phenolic composition. Such fluxing is preferably carried out before adding the vulcanizing system to avoid the risk of prevulcanization.

Suitable weight proportions in which the reinforcing compositions are used in rubber mixtures according to the present invention are as follows:

(a) When the reactive phenolic composition consists of a phenol/sulphur resin 1 to 15 parts phenol/sulphur resin per 100 parts of rubber; it is preferred to use 1 to 10 parts. When the reactive phenolic composition is based upon a substantially unmodified phenol/sulphur resin the loading of conventional free sulphur vulcanizing system can be substantially reduced if there are 10 or more parts of resin present per 100 parts of rubber. The free sulphur vulcanizing system must not however be omitted. At lower resin loadings, e.g. 5 parts per 100 rubber, and particularly with styrene/butadiene rubbers a substantial reduction in the usage of the free sulphur vulcanizing system can result, amongst other things, in inferior resistance to heat build-up.

(b) When the reactive phenolic composition does not consist solely of a phenol/sulphur resin, 1 to 100 parts of phenolic composition per 100 parts of rubber; it is preferred to use 1 to 30 parts.

Vulcanized rubber products formed from vulcanizable rubber mixtures containing the rubber reinforcing compositions according to the present invention have excellent properties. Specifically, marked increases in hardness and/or in modulus can be obtained and the extent of the increases can be greater than is attainable with conventional novolak type rubber reinforcing resins. Further, the reduction in tensile strength, which frequently accompanies marked increases in hardness and/or in modulus when these are obtained by the addition of significant proportions of novolak type rubber reinforcing resins, can be minimized by the use of the rubber reinforcing compositions of the present invention. Further indications of the excellent properties obtainable from vulcanized rubber products formed from vulcanizable rubber mixtures containing the rubber reinforcing compositions according to the present invention can be found from a consideration of resilience and of Goodrich heat build-up behaviour. Specifically, when using low proportions of the rubber reinforcing compositions, particularly with styrene/butadiene rubber, an improvement in resilience and a reduction in heat build-up can be obtained, particularly when the rubber reinforcing composition contains a substantial proportion of the preferred monohydric phenols of the invention, especially phenol ($C_6H_5OH$) and the lower meta alkyl phenols, reacted to a phenol/sulphur resin. When using low proportions of the rubber reinforcing compositions of the present invention with natural rubber the improvement in resilience and reduction in heat build-up is particularly noticeable if the rubber reinforcing composition is essentially, or contains a substantial proportion, of a resorcinol/sulphur resin. Further, at somewhat higher proportions of the rubber reinforcing compositions, the diminution of resilience and the increase in heat build-up which frequently accompanies increases in hardness can be minimized.

The following examples illustrate the manufacture of vulcanizable rubber mixtures according to the present invention and their vulcanization.

In these examples four reinforced rubber vulcanizable mixtures and vulcanized products obtained therefrom are described with respect to the various reinforcing resin compositions. The preparation of these four types of rubber products are described below as Procedures A, B, C and D respectively. The Goodrich heat build-up referred to in some of the following tables of test results is measured according to the procedure described in A.S.T.M. (Am. Soc. Testing Materials) D 623 52T.

PROCEDURE A 100 parts by weight of a styrene/butadiene rubber sold under the trade name "Intol 1502" was masticated on a laboratory two bowl rubber mixing and sheeting mill and then compounded with 3 parts by weight of zinc oxide, 1.5 parts by weight of stearic acid, 45 or 50 (usually 50, unless indicated otherwise in the tables) parts by weight of a carbon black filler sold under the trade name "Philblack O" and with 5, 10 or 20 parts by weight of the reinforcing resin composition according to the present invention. At the completion of this stage the compounded product was removed from the rolls and sufficient steam passed through the rolls to allow the temperature of the compound on further milling to rise quite rapidly to about 90° C. or to the temperature of the ball and ring softening point of the resin, whichever is the higher. The compound was replaced on the rolls and milling continued under these conditions of elevated temperature for a further 3 minutes in order to flux the resin. At the end of this period the compound and the rolls were allowed to cool, and when cool, 2.0 p.b.w. of sulphur and 1.1. p.b.w. of N-cyclohexyl-2-benzthiazyl sulphenamide (sold under the trade name Santocure) were mixed into the compound. The compound was sheeted off, allowed to stand for 6–24 hours before remilling. After remilling, the compound was then allowed to stand in the dark for 24 hours before vulcanizing for 20 minutes at 153° C. in a platen press developing not less than 400 lbs./sq. inch on the moulds throughout vulcanization.

PROCEDURE B

This procedure was the same as Procedure A except that the proportion of N-cyclohexyl-2-benzthiazyl sulphenamide (Santocure) was 1 part by weight, the vulcanization was carried out for 35 minutes at 145° C. and the proportion of the reinforcing composition according to the present invention was 5.0 parts by weight.

PROCEDURE C

This procedure is the same as Procedure A except that natural rubber (ribbed smoked sheets) is used in a formulation as follows:

| | Parts by weight |
|---|---|
| Natural rubber | 100 |
| Zinc oxide | 5 |
| Stearic acid | 2 |
| Carbon black sold under the trade name "Philblack O" | 50 |
| Reinforcing resin composition | 10 or 20 |
| N-cyclohexyl-2-benzthiazyl sulphenamide (Santocure) | 1 |
| Sulphur | 3 |

The vulcanization was carried out for 20 minutes at 141° C.

PROCEDURE D

This procedure is the same as Procedure A except that butadiene/acrylonitrile rubber sold under the trade name "Breon 1042" is used in a formulation as follows:

| | Parts by weight |
|---|---|
| Butadiene/acrylonitrile rubber (Breon 1042) | 100 |
| Stearic acid | 1 |
| Zinc oxide | 5 |
| Carbon black sold under the trade name Philblack O | 30, 40 or 50 |
| Reinforcing resin composition | 20, 10 or 0 |
| M.C. sulphur | 0.2 |
| Tetramethyl thiuram disulphide sold under the trade name Vulcafor TMT | 3 |
| Dibenzthiazyl disulphide sold under the trade name Vulcafor MBTS | 3 |

The vulcanization was carried out for 20 minutes at 153° C.

Example 1.—Preparation of a phenol/sulfur resin 282 grams of phenol, 96 grams of sulphur and 4.5 grams of sodium hydroxide (previously dissolved in 13.5 grams of water) were charged into a one litre flask. The reactants were heated with stirring to 120–125° C. and maintained at this temperature for 15 hours. During this time hydrogen sulphide was evolved. At the end of the reaction period the pressure was reduced to 11 cms. of mercury, the source of heat reapplied and distillation of the excess phenol continued until the resin reached the end temperature of 195° C. The resin was then poured into trays, and allowed to cool. This resin had a softening point of 80° C. and was dark green in colour. The cooled resin was ground to a fine powder with 10 parts of hexamethylene tetramine per 100 parts of resin to give a reinforcing resin composition according to the present invention. This composition is hereinafter referred to as composition I.

Preparation of a reinforced rubber composition

Reinforced rubber compositions were prepared according to Procedure A using the above reinforcing resin compositions. In addition comparative rubber compositions were prepared using no reinforcing resin and using a novolak reinforcing agent sold under the trade name Cellobond H831 (registered trademark). The novolak resin contained 7.4 parts by weight of hexamethylene tetramine per 100 parts of resin. The various compositions were tested and the results obtained are given in Table 1.

TABLE 1.—PROPERTIES OF REINFORCED RUBBER
Procedure A

| Resin proportion and type | Parts per 100 rubber of Philblack O | 200% modulus (lb./sq. in.) | Hardness (° BS) | Resilience |
|---|---|---|---|---|
| None | 50 | 1,660 | 73 | 46.0 |
| 10 Novolak | 50 | 1,810 | 83 | 46.6 |
| 10 Comp. I | 50 | 2,585 | 86 | 49.7 |
| 5 Comp. I | 45 | 2,050 | 80 | 53.9 |
| 5 Novolak | 45 | 1,450 | 76 | 51.0 |

Repetition of this procedure with a rubber composition containing 10 parts of composition I and omitting the sulphur gave a final product having a 200% modulus of 1175 lb./sq. in., a hardness of 82° B.S. and a resilience of 45.

The reinforcing resin composition of Example 1 was also tested according to Procedure B, and again comparative compositions were prepared using no reinforcing resin and using the novolak reinforcing resin described in the preceding paragraph. The results obtained are shown in Table 2. Reinforcing resin composition I was also tested according to Procedure C. The results obtained are shown in Table 3.

TABLE 2.—PROPERTIES OF REINFORCED RUBBERS
Procedure B

| Proportion, etc., of— | | | | | | |
|---|---|---|---|---|---|---|
| Resin | Philblack O | Dutrex oil | 200% modulus (lb./sq. in.) | Hardness (° BS) | Resilience | Goodrich heat build-up, ° C. |
| 0.0 | 50 | 3.0 | 1,360 | 73 | 47.5 | 71 |
| 5.0 Novolak | 45 | 0.0 | 1,255 | 75½ | 49.9 | 69 |
| 2.75 Comp. I | 45 | 2.3 | 2,035 | 76 | 58.9 | 53 |

TABLE 3.—PROPERTIES OF REINFORCED RUBBERS
Procedure C

| Proportion and type of Resin | Tensile strength (lb./sq. in.) | Hardness (° BS) |
|---|---|---|
| None | 3,200 | 75½ |
| 10 Novolak | 2,945 | 85½ |
| 10 Comp. I | 2,925 | 91 |

Example 2.—Preparation of the phenolic/sulphur resin 324 grams of 52/53 m. Cresol to BS521:1955 and 96 grams of sulphur were heated with 4.5 gm. of sodium hydroxide (previously dissolved in 13.5 gm. of water) in the manner of Example 1. At the end of the period of reaction the pressure was reduced to 8 cms. of mercury and cresols distilled to an end temperature of the resin at 205° C. This resin had a softening point of 100° C. It was converted into a reinforcing resin composition according to the present invention by grinding the cooled product into a fine powder with 10 parts of hexamethylene tetramine per 100 parts of resin. This composition is hereinafter referred to as composition II.

The reinforcing resin composition II was used to form rubber compositions according to Procedure A and comparative compositions containing no reinforcing resin and a novolak reinforcing resin sold under the trade name Cellobond H831 were also prepared. These rubber compositions were tested and the results obtained are given in Table 4.

TABLE 4.—PROPERTIES OF REINFORCED RUBBERS
Procedure A

| Proportion and type of resin | 200% modulus (lb./sq. in.) | Hardness (° BS) | Resilience |
|---|---|---|---|
| None | 1,620 | 73 | 45.0 |
| 10 parts of Novolak | 1,540 | 82 | 44.1 |
| 10 parts of Comp. II | 2,370 | 84 | 48.4 |

The reinforcing composition of Example 2 was also tested substantially according to Procedure B with and without the conventional sulphur vulcanizing agent and using 10 as well as 5 parts reinforcing composition. The results obtained are shown in Table 4A.

TABLE 4A.—PROPERTIES OF REINFORCED RUBBERS
Procedure B

| Proportions and type of resin | Parts per 100 rubber of Philblack O | Sulphur | Hardness (° BS) | Goodrich heat build-up (° C.) |
|---|---|---|---|---|
| None | 50 | 2.0 | 72 | 70 |
| 5 Comp. II | 45 | 2.0 | 77 | 54 |
| 5 Comp. II | 45 | 0.0 | 72 | >120 |
| 10 Comp. II | 45 | 2.0 | 82 | 50 |
| 10 Comp. II | 45 | 0.0 | 80 | 82 |

Example 3.—Preparation of the phenolic/sulphur resin 300 grams of a powdered cashew nut shell liquid modified phenolic novolak were charged to a one litre flask and the temperature of the resin cautiously raised by external heating and internal stirring to 120° C. At this point 75 grams of the powdered resin of Example 1 (but containing no hexamethylene tetramine) were slowly added with continued stirring. The pressure was reduced to about 10 cms. of mercury and heating and stirring continued to an end temperature of 140° C. The resin was then poured onto trays and allowed to cool. This resin had a softening point of 89° C. It was converted into a reinforcing resin composition according to the present invention by grinding the cooled resin to a fine powder with 10 parts of hexamethylene tetramine per 100 parts of resin. This composition is hereinafter referred to as Composition III.

The reinforcing resin Composition III was used to prepare rubber compositions according to Procedure A, and again comparative compositions containing no reinforcing resin and a novolak reinforcing resin (sold under the trade name Cellobond H831) were prepared. These compositions were tested and the results are shown in Table 5. Reinforced rubber compositions were also prepared from Composition III using Procedure C. Comparative examples were again prepared and the results obtained are shown in Table 6.

Reinforced rubber compositions were also prepared from Composition III using Procedure D. Comparative examples were again prepared and the results are shown in Table 7.

TABLE 5.—PROPERTIES OF REINFORCED RUBBERS
Procedure A

| Proportion and type of resin | 200% modulus (lb./sq. in.) | Hardness (° BS) | Resilience |
|---|---|---|---|
| None | 1,620 | 73 | 45.4 |
| 10 parts of Comp. III | 2,380 | 84½ | 47.7 |
| 10 parts of Novolak | 1,810 | 82 | 46.5 |
| 20 parts of Comp. III | 2,420 | 91½ | 45.1 |
| 20 parts of Novolak | 1,915 | 90½ | 40.6 |

TABLE 6.—PROPERTIES OF REINFORCED RUBBER COMPOSITION
Procedure C

| Proportion and type of resin | Tensile strength (lb./sq. in.) | Elongation at break (percent) | Hardness (° BS) |
|---|---|---|---|
| None | 3,200 | 310 | 75½ |
| 10 parts of Novolak | 2,920 | 290 | 85½ |
| 10 parts of Comp. III | 2,920 | 285 | 87 |
| 20 parts of Novololak | 2,480 | 230 | 90½ |
| 20 parts of Comp. III | 2,745 | 265 | 93 |

TABLE 7.—PROPERTIES OF REINFORCED RUBBER COMPOSITION
Procedure D

| Proportion of Philblack O | Proportion and type of resin | Tensile strength (lb./sq. in.) | 200% modulus (lb./sq. in.) | Hardness (° BS) |
|---|---|---|---|---|
| 50 | None | 2,730 | 1,450 | 75 |
| 40 | 10 parts of Novolak | 2,925 | 1,605 | 77 |
| 40 | 10 parts of Comp. III | 2,900 | 2,230 | 78 |
| 30 | 20 parts of Novolak¶ | 2,730 | 1,520 | 78 |
| 30 | 20 parts of Comp. III | 3,090 | 2,530 | 78 |

Example 4.—Preparation of the phenol/sulphur resin 300 grams of a powdered conventional phenol/formaldehyde novolak resin which is sold under the trade name Cellobond J2010 (registered trademark) was charged to a one litre flask and the temperature of the resin cautiously raised by external heating with internal stirring to 120° C. At this point 75 grams of the resin of Example 2 (but containing no hexamethylene tetramine) were added slowly with stirring. The pressure was reduced to 10 cms. of mercury and the heating continued to an end-temperature of 140° C. The resin was then poured into trays, and allowed to cool. This resin had a softening point of 97° C. It was converted into a reinforcing resin composition according to the present invention by grinding the cooled resin to a fine powder with 10 parts of hexamethylene tetramine per 100 parts of resin. This composition is hereinafter referred to as composition IV.

Reinforced rubber compositions were prepared from composition IV by Procedure A. By way of comparison a similar composition containing no reinforcing resin was prepared and also similar compositions containing a novolak reinforcing resin sold under the trade name Cellobond J2010. This novolak reinforcing resin contained 10 parts hexamethylene tetramine per 100 parts of resin. All rubber compositions were tested and the results obtained are given in Table 8.

TABLE 8.—PROPERTIES OF REINFORCED RUBBER COMPOSITION

Procedure A

| Proportion and type of resin | 100% modulus (lb./sq. in.) | Hardness (° BS) | Resilience |
|---|---|---|---|
| None | 530 | 72½ | 45.4 |
| 10 parts of Novolak | 700 | 82 | 44.0 |
| 10 parts of Comp. IV | 900 | 84 | 50.0 |
| 20 parts of Novolak | 900 | 88½ | 42.9 |
| 20 parts of Comp. IV | 1,105 | 89 | 48.5 |

Example 5.—Preparation of the phenol/sulphur/formaldehyde resin 282 grams of phenol, 96 grams of sulphur and 4.5 grams of sodium hydroxide (previously dissolved in 13.5 grams of water) were charged into a one litre flask. The reactants were heated with stirring to 120 to 125° C. and maintained at this temperature for 15 hours. During this period hydrogen sulphide was evolved. At the end of this period the reactants were cooled to about 60° C. and 125 grams of formalin (36% formaldehyde) and 14 grams of concentrated hydrochloric acid were added. The mixture was cautiously reheated to the reflux temperature and refluxed for 2 hours. The pressure was then slowly reduced to 26 cms. of mercury and the resin dehydrated to an end-temperature of 120° C. The resin was then poured to trays and allowed to cool. This resin had a softening point of 81° C. It was converted into a reinforcing resin composition according to the present invention by grinding the cooled resin to a fine powder with 10 parts of hexamethylene tetramine per 100 parts of resin. This composition is hereinafter referred to as composition V.

Reinforced rubber compositions were prepared using composition V according to the Procedure A. A comparative rubber containing no reinforcing resin was prepared. These rubber compositions were tested and the results are given in Table 9.

TABLE 9.—PROPERTIES OF REINFORCED RUBBER COMPOSITION

Procedure A

| Proportion and type of resin | 100% modulus (lb./sq. in.) | Hardness (° BS) | Resilience |
|---|---|---|---|
| None | 510 | 73 | 46.3 |
| 10 parts of Comp. V | 930 | 83½ | 47.5 |
| 20 parts of Comp. V | 950 | 88½ | 44.5 |

Example 6.—Preparation of modified phenol/sulphur/formaldehyde resin 282 grams of phenol, 96 grams of sulphur and 4.5 grams of sodium hydroxide, previously dissolved in 13.5 grams of water, were charged into a one litre flask and reacted substantially in the manner of Example 5. At the conclusion of the phenol/sulphur reaction stage the mixture was cooled and 125 grams of formalin and 14 grams of concentrated hydrochloric acid were added when the mixture was at 60° C. During the dehydration stage 36 grams of a phenolic modified partially polymerized cashew-nut shell oil were added when the resin reached 100° C. The pressure was again reduced to 26 cms. of mercury and the dehydration continued as in Example 5 to 120° C. The resin was then poured to trays and allowed to cool. This resin had a softening point of 84° C. It was converted into a reinforcing resin composition according to the present invention by grinding the cooled resin to a fine powder with 10 parts of hexamethylene tetramine per 100 parts of resin. This composition is hereinafter referred to as composition VI.

Reinforced rubber compositions were prepared using composition VI according to the Procedure A. A comparative rubber containing no reinforcing resin was prepared. These rubber compositions were tested and the results are given in Table 10.

TABLE 10.—PROPERTIES OF REINFORCED RUBBERS

Procedure A

| Proportion and type of resin | 200% modulus (lb./sq. in.) | Hardness (° BS) | Resilience |
|---|---|---|---|
| None | 500 | 73 | 46.3 |
| 10 of Comp. VI | 750 | 85 | 46.8 |
| 20 of Comp. VI | 860 | 90 | 45.7 |

Example 7.—Preparation of the phenolic/sulphur resin 160 grams of cyclopentenylphenol (mixed ortho and para isomers, approx. 80% para) and 32 grams of sulphur were charged into a one litre flask. The reactants were heated with stirring to 120° C. and held at this temperature for 6 hours. The product was cooled to 60° C. and 32 grams of 97% paraform added together with 0.8 gram of caustic soda previously dissolved in 1.0 ml. of water. This mixture was held at 60° C. for one hour and then neutralized with 1.2 grams of glacial acetic acid. 376 grams of phenol, 62 grams of 97% paraform and 2 millilitres of concentrated sulphuric acid, previously dissolved in 2 millilitres of water, were added. This mixture was heated to 100° C. and held at this temperature for one hour. 3.0 grams of calcium hydroxide were added and the product dehydrated at atmospheric pressure to an end-temperature of 150° C. The resin was then poured into trays and allowed to cool. This resin had a softening point of 94° C. It was converted into a reinforcing resin composition according to the present invention by grinding the cooled resin to a fine powder with 10 parts of hexamethylene tetramine per 100 parts of resin. This composition is hereinafter referred to as composition VII.

Reinforced rubber compositions were prepared using composition VII according to Procedure A. A comparative rubber containing no reinforcing resin was prepared. These rubber compositions were tested and the results are given in Table 11.

TABLE 11.—PROPERTIES OF REINFORCED RUBBERS

Procedure A

| Proportion and type of resin | 200% modulus (lb./sq. in.) | Hardness (° BS) | Resilience |
|---|---|---|---|
| None | 1,580 | 71½ | 50.6 |
| 10 of Comp. VII | 1,720 | 82 | 47.7 |
| 20 of Comp. VII | 1,940 | 85 | 45.7 |

Example 8.—Preparation of the phenolic/sulphur resin 110 grams of resorcinol, 64 grams of sulphur and 3 grams of sodium hydroxide, previously dissolved in 10 ml. of water, were charged into a 500 ml. flask. The reactants were heated with stirring to 135° C. over a period of one hour and maintained within the temperature range 135–140° C. for a further hour. During the reaction hydrogen sulphide was evolved and during the earlier part of reaction at elevated temperature some foaming took place. At the end of the reaction period the resin was poured into trays and allowed to cool. The resin had a softening point of 97° C. It was converted into a reinforcing resin composition according to the present invention by grinding the cooled product into a fine powder with 10 parts of hexamethylene tetramine per 100 parts of resin. This composition is hereinafter referred to as composition VIII.

Preparation of the modified phenolic/sulphur resin 400 grams of a powdered conventional phenol formaldehyde novolak resin which is sold under the trade name Cellobond J2010 (registered trademark) were charged to a one litre flask and the temperature of the resin cautiously raised by external heating with internal stirring to 125° C. At this point 100 grams of the base resin of composition VIII (but containing no hexamethylene tetramine) were added slowly with stirring. The pressure was reduced to 10 cms. of mercury and the heating continued to an end temperature of 140° C. The resin was then poured into trays and allowed to cool. This resin had a softening point of 100° C. It was converted into a reinforcing resin composition according to the present invention by grinding the cooled product into a fine powder with 10 parts of hexamethylene tetramine per 100 parts of resin. This composition is hereinafter referred to as composition IX.

Reinforced rubber compositions were prepared using compositions VIII and IX substantially according to the natural rubber Procedure C, except that the proportion of the resin and Philblack O were as indicated in Table 12. A comparative rubber containing no reinforcing resin was prepared. These rubber compositions were tested and the results are given in Table 12.

TABLE 12.—PROPERTIES OF REINFORCED RUBBERS

Procedure C

| Proportion and type of resin | Proportion of Philblack O | 300% modulus (lb./sq. in.) | Hardness (° BS) | Goodrich heat build-up (° C.) |
|---|---|---|---|---|
| None | 50 | 3,290 | 76 | 41 |
| 5 of Comp. VIII | 45 | 3,220 | 76½ | 29 |
| 5 of Comp. IX | 45 | 2,810 | 79 | 33 |

We claim:

1. A vulcanizable rubber mixture comprising a rubber selected from the group consisting of natural rubber and a synthetic di-olefinically unsaturated rubber, a free sulphur vulcanizing system and a rubber reinforcing composition having a ring and ball softening point greater than 75° C. comprising (a) a formaldehyde donor present in an amount in the range 6–15% by weight of the rubber reinforcing composition and (b) a phenol/sulphur resin wherein the mole/atom ratio of combined phenol to combined sulphur is in the range 0.5 to 1.5 and wherein the resin is prepared by reacting sulphur with a phenol selected from the group consisting of phenol, ortho-cresol, meta-cresol, para-cresol, a resorcinol and a lower alkenyl phenol in the presence of an alkaline catalyst, the amount of phenol/sulphur resin present being in the range 1–15% by weight of the rubber.

2. A vulcanizable rubber mixture according to claim 1 wherein the rubber is a styrene/butadiene rubber.

3. A vulcanizable rubber mixture according to claim 1 wherein the phenol/sulphur resin is derived from commercial cresol containing from 40–100% by weight of meta-cresol.

4. A vulcanizable rubber mixture according to claim 1 wherein the formaldehyde donor is hexamethylene tetramine.

5. A vulcanizable rubber mixture comprising a rubber selected from the group consisting of natural rubber and a synthetic di-olefinically unsaturated rubber, a free sulphur vulcanizing system and a rubber reinforcing composition comprising (a) a formaldehyde donor present in an amount in the range 6–15% by weight of the rubber reinforcing composition, (b) a phenol/sulphur resin wherein the mole/atom ratio of combined phenol to combined sulphur is in the range 0.5 to 1.5 and wherein the resin is prepared by reacting sulphur with a phenol selected from the group consisting of phenol, ortho-cresol, meta-cresol, para-cresol, a resorcinol, and a lower alkenyl phenol in the presence of an alkaline catalyst, the amount of phenol/sulphur resin present being in the range 1–15% by weight of the rubber, and (c) a novolak resin prepared by reacting formaldehyde in an acid reaction medium with a molar excess of a phenol selected from the group consisting of phenol, ortho-cresol, metal-cresol, para-cresol, a xylenol and a phenol obtained from cashewnut shell liquid, wherein the weight proportion of phenol/sulphur resin to novolak resin is from 1 to 6 parts of novolak resin to 1 part of phenol/sulphur resin.

6. A vulcanizable rubber mixture according to claim 1 wherein the phenol/sulphur resin is prepared under conditions which leave some phenol unreacted and wherein the unreacted phenol is further reacted with an aldehyde under novolak reaction conditions to form a modified phenol/sulphur resin.

7. A vulcanizable rubber mixture according to claim 1 wherein the phenol/sulphur resin is modified by reacting it with an aldehyde under alkaline conditions and further reacting the resulting product with additional phenol and additional aldehyde under novolak reaction conditions.

8. A vulcanizable rubber mixture according to claim 1 wherein the rubber reinforcing composition has a ball and ring softening point within the range 80–105° C. and a heat hardening time of less than 25 minutes.

9. Vulcanized products when prepared by the vulcanization of a rubber mixture according to claim 1.

References Cited

UNITED STATES PATENTS 1,787,618  1/1931  Ellis _____ 260—48
2,394,564  2/1946  Reiff et al. _____ 260—3

FOREIGN PATENTS 151,877  10/1950  Australia.

MURRAY TILLMAN, Primary Examiner

M. J. TULLY, Assistant Examiner

U.S. Cl. X.R.

260—4, 5, 19, 48, 839, 845, 847, 848, 887, 888, 897